United States Patent
Maske

(10) Patent No.: US 6,168,244 B1
(45) Date of Patent: Jan. 2, 2001

(54) PARK BRAKE RELEASE APPARATUS AND METHOD

(75) Inventor: Jeffery D. Maske, Geneseo, IL (US)

(73) Assignee: Case Corporation, Racine, WI (US)

( * ) Notice: Under 35 U.S.C. 154(b), the term of this patent shall be extended for 0 days.

(21) Appl. No.: 09/097,134

(22) Filed: Jun. 12, 1998

(51) Int. Cl.[7] .................................................... B60T 13/74
(52) U.S. Cl. ................ 303/3; 303/15; 303/901
(58) Field of Search ................ 303/3, 15, 71, 303/89; 188/3 R, 3 H, 151 R, 152, 345

(56) References Cited

U.S. PATENT DOCUMENTS

| | | |
|---|---|---|
| 3,692,156 | 9/1972 | Week . |
| 3,730,303 | 5/1973 | Bricker et al. . |
| 3,893,549 | 7/1975 | Bennett . |
| 3,954,304 | 5/1976 | Engle . |
| 3,999,075 | 12/1976 | Johnson et al. . |
| 4,505,519 * | 3/1985 | Muterel ................ 188/345 |
| 4,697,852 | 10/1987 | Scholz . |
| 4,722,575 | 2/1988 | Graham . |
| 4,749,236 | 6/1988 | Graham . |
| 4,813,518 | 3/1989 | Akiyama et al. . |
| 4,840,257 | 6/1989 | Harrison . |
| 5,052,532 * | 10/1991 | Plate ........................... 303/71 |
| 5,119,912 | 6/1992 | Martin . |
| 5,203,616 | 4/1993 | Johnson . |
| 5,238,298 | 8/1993 | Wagner et al. . |
| 5,310,251 * | 5/1994 | Towers et al. ................ 303/15 |
| 5,601,160 | 2/1997 | Horsch . |
| 5,601,162 | 2/1997 | Heimann . |
| 5,984,425 * | 11/1999 | Orzal ........................... 303/15 |

* cited by examiner

Primary Examiner—Matthew C. Graham
Assistant Examiner—Lan Nguyen
(74) Attorney, Agent, or Firm—Brinks Hofer Gilson & Lione

(57) ABSTRACT

A park brake release apparatus includes a service brake valve assembly operably connected to a service brake piston. A one-way valve is operably connected between the service brake piston and a park brake piston to allow fluid to flow from the service brake circuit to the park brake piston to release a park brake.

38 Claims, 2 Drawing Sheets

PARK BRAKE RELEASE APPARATUS AND METHOD

FIELD OF THE INVENTION

Figure 1:
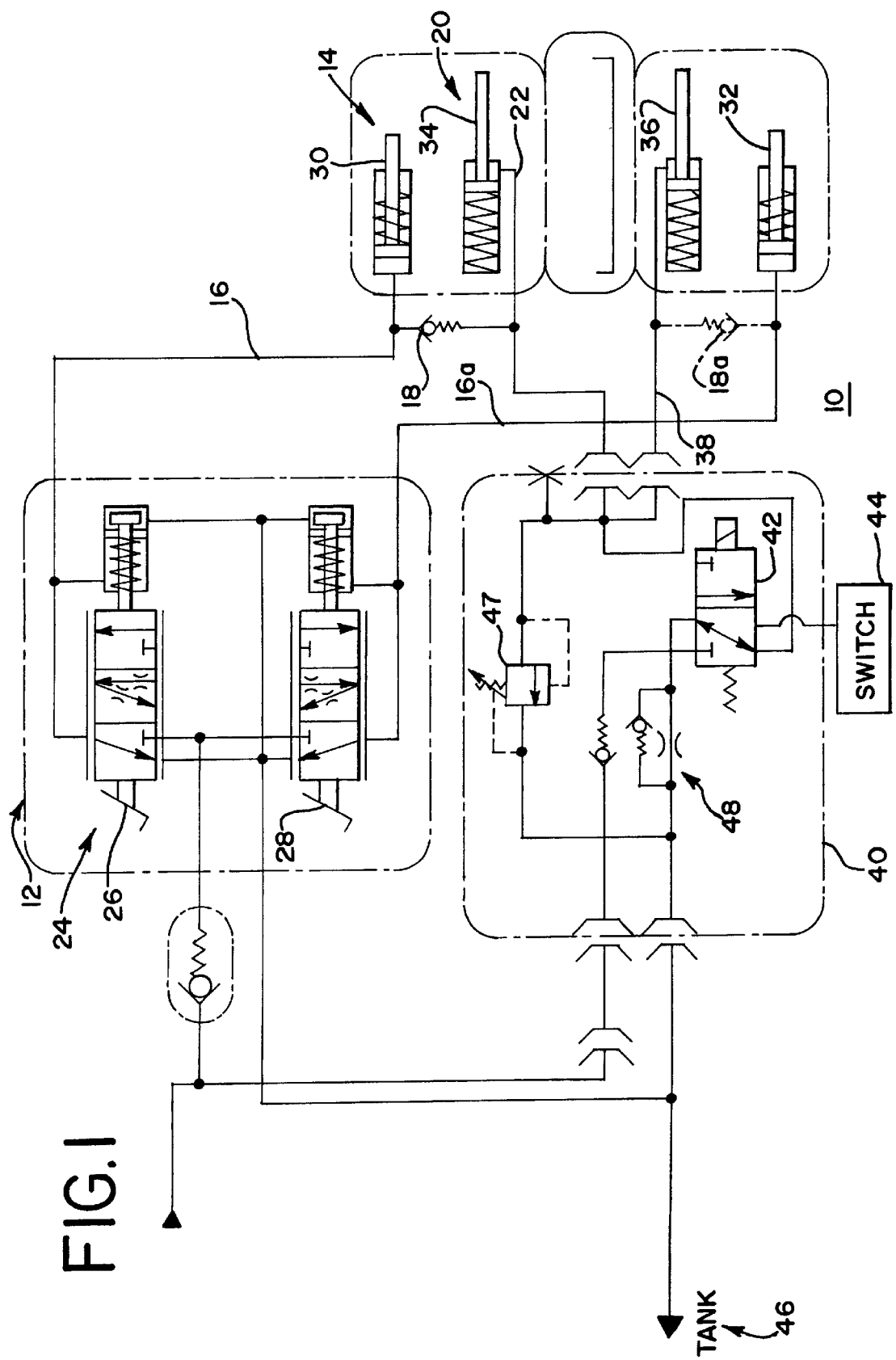

This invention relates generally to a park brake release apparatus for releasing a park brake. In particular, the invention relates to a park brake release apparatus which allows an operator to release the park brake, without engine power, by pumping a service brake pedal.

BACKGROUND OF THE INVENTION

Agricultural machines, such as harvesting combines and cotton pickers, typically have a hydraulically operated parking brake which can be set and released from inside the cab when the engine is running. However, if there is no engine power, and the park brake is set, there is typically no way to release the brake from the inside of the cab. Instead, the brake must be released manually from a position outside of the cab. This is typically done by manually pumping grease to the park brake pistons of the park brake via a tow valve which is located adjacent the cab deck.

There are several disadvantages to this approach. Since the tow valve is located outside of the cab, the park brake cannot be released conveniently from inside of the cab. Moreover, the grease which must be pumped to the park brake pistons may contaminate the hydraulic system. In particular, the viscosity of the grease is much higher than the hydraulic oil, and as a result, the components of the hydraulic system may become fouled and the speed of the brake functions may decrease. Furthermore, cold grease may cause a relief valve (which is used to protect the hydraulic system from over pressurization) to open before the park brake is released. Finally, a complete set of tools, including a grease gun and wrenches, are required to access the tow valve and manually release the park brake.

Accordingly, it would be desirable to have a park brake release apparatus that overcomes the disadvantages described above, and to provide a simple and cost effective park brake release apparatus.

SUMMARY OF THE INVENTION

One aspect of the invention provides a park brake release apparatus including a service brake valve assembly operably connected to a service brake piston. A one-way valve is operably connected between the service brake piston and a park brake piston to allow fluid to flow from the service brake valve assembly to the park brake piston to release a park brake. The fluid may preferably be hydraulic fluid. The one-way valve may preferably be rated at approximately 5 pounds per square inch. The service brake valve assembly may include at least one service brake pedal for flowing fluid from the service brake valve assembly to the park brake piston. The service brake pedal may be comprised of a left service brake pedal or a right service brake pedal. The service brake piston may be comprised of a left service brake piston and a right service brake piston. The park brake piston may be comprised of a left park brake piston and a right park brake piston. The one-way valve may be operably connected between the left service brake piston and the left park brake piston to allow fluid to flow from the service brake valve assembly to the left park brake piston and the right park brake piston to release the park brake. Alternatively, the one-way valve may be operably connected between the right service brake piston and the right park brake piston to allow fluid to flow from the service brake valve assembly to the right park brake piston and the left park brake piston to release a park brake. A park brake valve assembly may include a park brake valve. The park brake valve may preferably be a park brake solenoid valve. The park brake valve assembly may preferably be connected to the park brake piston. A park brake switch may be operably connected to the park brake valve to prevent fluid from flowing through the park brake valve assembly to a tank when the park brake switch is in the "off" position.

Another aspect of the invention provides a park brake release apparatus which includes a service brake valve assembly and a service brake piston. A service brake line connects the service brake valve assembly to the service brake piston. A park brake line connects a park brake valve assembly to a park brake piston. A one-way valve is connected between the service brake line and the park brake line to allow fluid to flow from the service brake line to the park brake line to release a park brake. The park brake valve assembly may include a park brake valve which may preferably be a park brake solenoid valve. A park brake switch may be operably connected to the park brake valve to prevent fluid from flowing through the park brake valve assembly to a tank when the park brake switch is in the "off" position. The service brake valve assembly may include at least one service brake pedal for pumping fluid from the service brake valve assembly to the park brake piston.

Another aspect of the invention provides a method of releasing a park brake on a machine which has no engine power. A service brake valve assembly is provided. A service brake piston is operably connected to the service brake valve assembly. A one-way valve is operably connected between the service brake piston and a park brake piston. A brake pedal is pumped and fluid is flowed from the service brake valve assembly to the park brake piston to release a park brake. The fluid may preferably be hydraulic fluid. A park brake valve assembly including a park brake valve may be provided. Fluid may preferably be prevented from flowing through the park brake valve assembly to a tank while pumping the brake pedal. A park brake switch operably connected to the park brake valve may be provided. The park brake switch may preferably be turned to the "off" position.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE DRAWINGS

Figure 2:
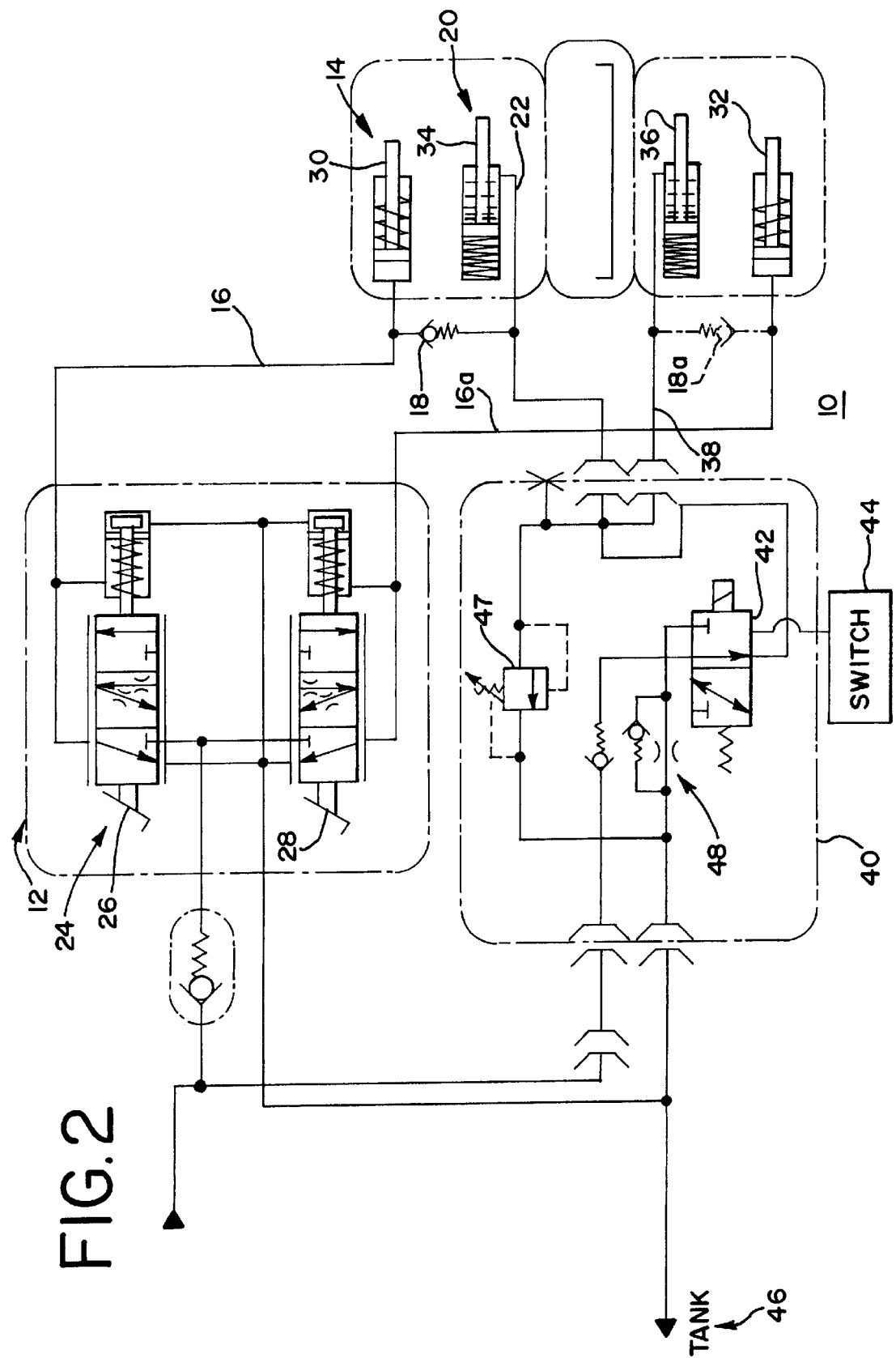

FIG. 1 is a schematic of a preferred embodiment of a park brake release appartus which is made in accordance with the invention; and FIG. 2 is a schematic of the embodiment of FIG. 1 which shows the position of the park brake pistons when the park brake is "off" (released) and the position of the park brake valve when the park brake switch is in the "off" position.

DETAILED DESCRIPTION OF THE PRESENTLY PREFERRED EMBODIMENTS

As shown in FIG. 1, a preferred embodiment of a park brake release apparatus 10 includes a service brake valve assembly 12 operably connected to a service brake piston 14 by a service brake line 16. A one-way valve 18 is operably connected between the service brake piston 14 and a park brake piston 20 to allow fluid to flow from the service brake valve assembly 12 to the park brake piston 20 to release a park brake. In the embodiment shown, the one-way valve 18 is connected between the service brake line 16 and a park brake line 22 to allow fluid to flow from the service brake line 16 to the park brake line 22.

The one-way valve 18 may be any of the commercially available one-way valves, such as a standard check valve. The valve 18 allows fluid to flow in only one direction, and is preferably rated at approximately 5 pounds per square inch. The fluid which flows through the park brake release apparatus 10 may preferably be hydraulic fluid.

In the embodiment shown, the service brake valve assembly 12 may include a least one service brake pedal 24 for flowing fluid from the service brake valve assembly 12 to the park brake piston 20. In the embodiment shown, the service brake pedal 24 may include a left service brake pedal 26 and a right service brake pedal 28.

As shown in FIG. 1, the service brake piston 14 may include a left service brake piston 30 and a right service brake piston 32. Similarly, the park brake piston 20 may include a left park brake piston 34 and a right park brake piston 36. The service brake pistons 30, 32 and the park brake pistons 34, 36 may be any of the commercially available pistons, and various configurations are contemplated.

In the embodiment shown, the park brake pistons 34, 36 are spring applied and pressure released. FIG. 1 shows the position of the park brake pistons 34, 36 when the park brake is "on" (applied). FIG. 2 shows the position of the park brake pistons 34, 36 when the park brake is "off" (released). In the embodiment shown, the left park brake piston 34 and the right park brake piston 36 are linked via a park brake valve assembly 40 and lines 22 and 38 so that they operate in unison.

In the embodiment shown, the one-way valve 18 may be operably connected between the left service brake piston 30 and the left park brake piston 34. In operation, when the left service brake pedal 26 is pumped, fluid flows from service brake valve assembly 12, through the service brake line 16 to the left service brake piston 30, through the one-way valve 18 to the left park brake piston 34, and through line 38 to the right park brake piston 36 to release the park brake.

Alternatively, the one-way valve 18a may be operably connected between the right service brake piston 32 and the right park brake piston 36. In operation, when the right brake pedal 28 is pumped, fluid flows from service brake valve assembly 12, through the service brake line 16a to the right service brake piston 32, through the one-way valve 18a to the right park brake piston 36, and through lines 38 and 22 to the left park brake piston 34 to release the park brake.

As shown in FIG. 1, a park brake valve assembly 40 includes a park brake valve 42. In the embodiment shown, the park brake valve assembly 40 is connected to the park brake pistons 34, 36 by park brake lines 22 and 38. The park brake valve 42 may preferably be, for example, a park brake solenoid valve. In the embodiment shown, a park brake switch 44 is operably connected to the park brake solenoid valve 42.

FIG. 1 shows the position of the park brake valve 42 when the park brake switch 44 is in the "on" position. When the park brake switch 44 is in the "on" position, fluid flows from the park brake pistons 34, 36 and through the park brake valve assembly 40 to a holding tank 46 which causes the park brake to be applied. FIG. 2 shows the position of the park brake valve 42 when the park brake switch 44 is in the "off" position. When the park brake switch 44 is in the "off" position, the fluid cannot flow from the park brake pistons 34, 36 through the park brake valve assembly 40, which causes the park brake to be released.

In the embodiment shown in FIGS. 1–2, a park brake relief valve 47 may preferably be provided. This valve 47 protects the park brake pistons 34, 36, from being overpressurized. The valve 47 may preferably have a setting of 360 to 400 psi. Moreover, a park brake delay check valve 48 may also be provided. The delay check valve 48 provides for a controlled park brake engagement should the park brake switch be turned "on" while the machine is moving. The check poppet also may preferably have a 0.040 inch orifice drilled through it to allow the park brake pressure to go to zero for full park brake force.

The park brake release apparatus 10 may be used in agricultural and construction machinery, such as, for example, harvesting combines, cotton pickers, tractors and loaders. It is contemplated that the park brake release apparatus 10 may also be used in wide variety of other types of machinery.

The park brake apparatus 10 shown in FIGS. 1–2 can be used for releasing a park brake on a machine which has no engine power. For example, the park brake switch 44 is turned to the "off" position which prevents fluid from flowing through the park brake valve assembly 40 to the tank 46. The left service brake pedal 26 is pumped. Fluid flows from the service brake valve assembly 12 to the park brake pistons 34 and 36 to release a park brake.

One advantage of this invention is that the park brake can be released without engine power by the operator easily and quickly from inside the cab without any tools. This greatly enhances the safety of the machine. Moreover, the invention eliminates the need for a tow valve to manually release the park brake which reduces the valve complexity of the system and eliminates the chance of contamination of the hydraulic system.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A park brake release apparatus comprising:
    a service brake valve assembly, a left service brake piston, a right service brake piston, a service brake line connecting the service brake valve assembly to the left service brake piston, a left park brake piston, a right park brake piston, and a one-way valve operably connected between the service brake line and the left park brake piston, said one-way valve operably connected to said service brake line between said service brake valve assembly and said left service brake piston to allow fluid to flow from the service brake valve assembly to the left park brake piston and the right park brake piston to release a park brake.

2. The apparatus of claim 1 wherein the service brake valve assembly includes at least one service brake pedal for flowing fluid from the service brake valve assembly to the left park brake piston.

3. The apparatus of claim 2 wherein the at least one service brake pedal comprises a left pedal and a right pedal.

4. The apparatus of claim 1 further comprising:
    a park brake valve assembly including a park brake valve, the park brake valve assembly connected to at least one of the left and right park brake pistons.

5. The apparatus of claim 4 wherein the park brake valve is a park brake solenoid valve.

6. The apparatus of claim 4 further comprising a park brake switch moveable between at least an on and an off position, said park brake switch operably connected to the park brake valve to prevent fluid from flowing through the park brake valve assembly to a tank when the park brake switch is in the off position.

7. The apparatus of claim 4 wherein said park brake valve assembly is connected to each of the left and right park brake pistons, and further comprising a first park brake line connecting the park brake valve assembly to the left park brake piston and a second park brake line connecting the park brake valve assembly to the right park brake piston.

8. The apparatus of claim 7 wherein said first and second park brake lines are interconnected.

9. The apparatus of claim 1 wherein the fluid is hydraulic fluid.

10. The apparatus of claim 1 wherein the one-way valve is rated at approximately 5 pounds per square inch.

11. The apparatus of claim 1 comprising at least one park brake line connecting the left and right park brake pistons.

12. A park brake release apparatus comprising:
a service brake valve assembly, a left service brake piston, a right service brake piston, at least one service brake line connecting the service brake valve assembly to each of the left and right service brake pistons, a park brake valve assembly, a left park brake piston, a right park brake piston, a park brake line connecting the park brake valve assembly to each of the left and right park brake pistons, a one-way valve connected between the at least one service brake line and the park brake line to allow fluid to flow from the at least one service brake line to the park brake line and to the left park brake piston and the right park brake piston to release a park brake.

13. The apparatus of claim 12 wherein the park brake valve assembly includes a park brake valve.

14. The apparatus of claim 13 wherein the park brake valve is a park brake solenoid valve.

15. The apparatus of claim 14 further comprising a park brake switch operably connected to the park brake valve to prevent fluid from flowing through the park brake valve assembly to a tank when the park brake switch is in the "off" position.

16. The apparatus of claim 12 wherein the service brake valve assembly includes at least one service brake pedal for pumping fluid from the service brake valve assembly to the left and right park brake pistons.

17. The apparatus of claim 12 wherein said park brake line comprises a first park brake line connecting the park brake valve assembly to the left park brake piston and a second park brake line connecting the park brake valve assembly to the right park brake piston, wherein the first and second park brake lines are interconnected.

18. The apparatus of claim 17 wherein the one-way valve is connected between the service brake line and the first park brake line.

19. A method of releasing a park brake comprising:
providing a service brake valve assembly, a left service brake piston, a right service brake piston, a service brake line connecting the service brake valve assembly to the left service brake piston, a left park brake piston, a right park brake piston, and a one-way valve operably connected between the service brake line and the left park brake piston, said one-way valve operably connected to said service brake line between said service brake valve assembly and said left service brake piston;

pumping a brake pedal; and flowing fluid from the service brake valve assembly through said service brake line in response to said pumping of said brake pedal to the left and right park brake pistons through said one-way valve to release a park brake.

20. The method of claim 19 further comprising:

providing a park brake valve assembly including a park brake valve; and preventing the fluid from flowing through the park brake valve assembly to a tank while pumping the brake pedal.

21. The method of claim 20 further comprising providing a park brake switch operably connected to the park brake valve, wherein said park brake switch is moveable between an on position and an off position; and turning the park brake switch to the off position.

22. The method of claim 21 further comprising:

providing an engine without power.

23. The method of claim 19 wherein the fluid is hydraulic fluid.

24. A park brake release apparatus comprising:
a service brake valve assembly, a left service brake piston, a right service brake piston, a service brake line connecting the service brake valve assembly to the right service brake piston, a left park brake piston, a right park brake piston, and a one-way valve operably connected between the service brake line and the right park brake piston, said one-way valve operably connected to said service brake line between said service brake valve assembly and said right service brake piston to allow fluid to flow from the service brake valve assembly to the right park brake piston and the left park brake piston to release a park brake.

25. The apparatus of claim 24 wherein the service brake valve assembly includes at least one service brake pedal for flowing fluid from the service brake valve assembly to the right park brake piston.

26. The apparatus of claim 25 wherein the at least one service brake pedal comprises a left pedal and a right pedal.

27. The apparatus of claim 24 further comprising:

a park brake valve assembly including a park brake valve, the park brake valve assembly connected to at least one of the left and right park brake pistons.

28. The apparatus of claim 27 wherein the park brake valve is a park brake solenoid valve.

29. The apparatus of claim 27 further comprising a park brake switch moveably between at least an on and an off position, said park brake switch operably connected to the park brake valve to prevent fluid from flowing through the park brake valve assembly to a tank when the park brake switch is in the off position.

30. The apparatus of claim 27 wherein said park brake valve assembly is connected to each of the left and right park brake pistons, and further comprising a first park brake line connecting the park brake valve assembly to the left park brake piston and a second park brake line connecting the park brake valve assembly to the right park brake piston.

31. The apparatus of claim 30 wherein said first and second park brake lines are interconnected.

32. The apparatus of claim 24 comprising at least one park brake line connecting the left and right park brake pistons.

33. A method of releasing a park brake comprising:
providing a service brake valve assembly, a left service brake piston, a right service brake piston, a service brake line connecting the service brake valve assembly to the right service brake piston, a left park brake piston, a right park brake piston, and a one-way valve operably connected to said service brake line between said service brake valve assembly and said right service brake piston;

pumping a brake pedal; and flowing fluid from the service brake valve assembly through said service brake line in response to said pumping of said brake pedal to the right and left park brake pistons through said one-way valve to release a park brake.

34. The method of claim 33 comprising providing at least one park brake line connecting the left and right park brake pistons, and flowing said fluid from said service brake line to the left and right park brake pistons through said one-way valve and said park brake line.

35. The method of claim 34 further comprising providing a park brake valve assembly including a park brake valve, and preventing the fluid from flowing through the park brake valve assembly to a tank while pumping the brake pedal.

36. The method of claim 35 further comprising providing a park brake switch operably connected to the park brake valve, wherein said park brake switch is moveable between an on position and an off position, and turning the park brake switch to an off position.

37. The method of claim 35 wherein said park brake valve assembly is connected to each of the left and right park brake pistons, and further comprising a first park brake line connecting the park brake valve assembly to the left park brake piston and a second park brake line connecting the park brake valve assembly to the right park brake piston.

38. The method of claim 37 wherein said first and second park brake lines are interconnected.

* * * * *